United States Patent
Gruich

(12) 
(10) Patent No.: US 6,464,276 B1
(45) Date of Patent: Oct. 15, 2002

(54) AERODYNAMIC STORAGE UNIT FOR TRUCK BED

(76) Inventor: Peter T. Gruich, 37815 Carpathia, Sterling Heights, MI (US) 48310

(*) Notice: Subject to any disclaimer, the term of this patent is extended or adjusted under 35 U.S.C. 154(b) by 0 days.

(21) Appl. No.: 09/687,514

(22) Filed: Oct. 13, 2000

(51) Int. Cl.⁷ .............................................. B62D 43/00
(52) U.S. Cl. .................. 296/37.6; 296/183; 224/402; 224/403; 224/404
(58) Field of Search .............................. 296/37.6, 183; 224/402, 403, 404

(56) References Cited

U.S. PATENT DOCUMENTS

| | | | |
|---|---|---|---|
| 252,996 A | 1/1882 | Bringier | 296/57.1 |
| 584,167 A | 6/1897 | Shanklin | 224/401 |
| 770,572 A | 9/1904 | Gnatzig | 296/57.1 |
| 1,287,855 A | 12/1918 | Brand | 296/19 |
| 1,960,539 A | 5/1934 | Kneuer | 296/57.1 |
| 3,010,760 A | 11/1961 | Trautmann | 296/57.1 |
| 3,727,971 A | 4/1973 | Sisler | 296/37 R |
| 3,731,831 A | 5/1973 | Huff | 214/506 |
| 4,003,596 A | 1/1977 | Robertson | 296/37.6 |
| 4,106,643 A * | 8/1978 | McGehee | 414/528 |
| 4,580,828 A | 4/1986 | Jones | 296/57.1 |
| 4,629,390 A | 12/1986 | Burke | 296/39.2 |
| 4,635,992 A | 1/1987 | Hamilton et al. | 296/37.6 |
| 4,681,360 A | 7/1987 | Peters et al. | 296/37.6 |
| 4,693,507 A | 9/1987 | Dressen et al. | 296/39.2 |
| 4,705,317 A | 11/1987 | Henri | 296/37.6 |
| 4,824,158 A | 4/1989 | Peters et al. | 296/37.6 |
| 4,938,398 A | 7/1990 | Hallsen | 224/42.42 |
| 5,232,259 A | 8/1993 | Booker | 296/37.6 |
| 5,303,969 A | 4/1994 | Simnacher | 296/37.6 |
| 5,620,124 A | 4/1997 | Geier | 224/404 |
| 5,667,268 A | 9/1997 | Bump | 296/100 |
| 5,713,500 A | 2/1998 | Ingerson et al. | 224/404 |
| 5,743,589 A | 4/1998 | Felker | 296/180.5 |
| 5,769,479 A | 6/1998 | Emery | 296/39.2 |
| 5,848,818 A * | 12/1998 | Flueckinger | 296/37.6 |
| 5,927,788 A | 7/1999 | Long | 296/39.2 |
| 5,971,461 A | 10/1999 | Vaishnav et al. | 296/37.12 |
| 6,003,923 A | 12/1999 | Scott et al. | 296/37.6 |
| 6,139,080 A * | 10/2000 | Saffold | 296/37.6 |
| 6,203,087 B1 * | 3/2001 | Lance et al. | 296/37.6 |
| 6,325,448 B1 * | 12/2001 | Estrada et al. | 296/180.1 |

* cited by examiner

*Primary Examiner*—Joseph D. Pape
*Assistant Examiner*—Lori L Coletta
(74) *Attorney, Agent, or Firm*—Gifford, Krass, Groh, Sprinkle, Anderson & Citkowski, PC

(57) ABSTRACT

An aerodynamic storage unit is designed for a truck bed with a load floor that extends between a pair of longitudinal side walls. This storage unit has an inner wall which is spaced apart from one of the pair of longitudinal side walls so that a storage space is defined between the inner wall and the side wall. The inner wall member has a lower edge located on the load floor and an upper edge which is joined to the side wall. At least a portion of the inner wall member between the upper and lower edges is outwardly inclined. At least one access opening is provided in the inner wall. A door is located in the access opening. The door has a lower edge which is connected to the inner wall using a hinge, and an upper end. The lower end of the door is closer to the load floor than the upper end of the door. The door operates to open inwardly so that the storage space can be accessed through the opening when the door is opened.

6 Claims, 5 Drawing Sheets

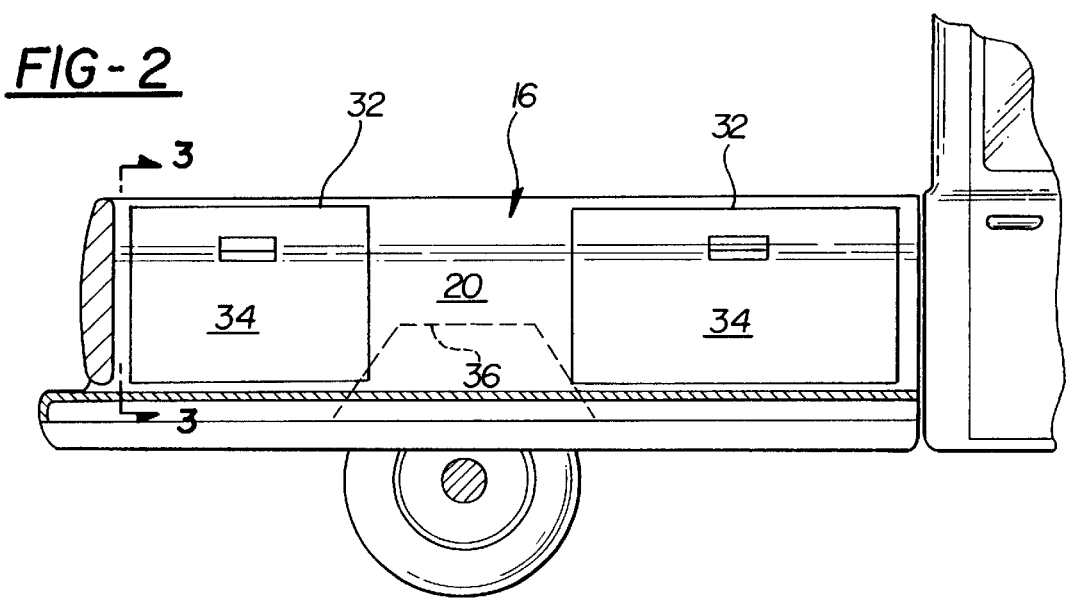
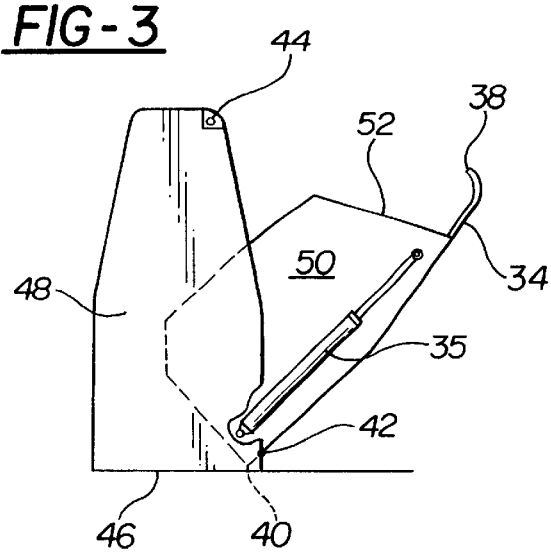
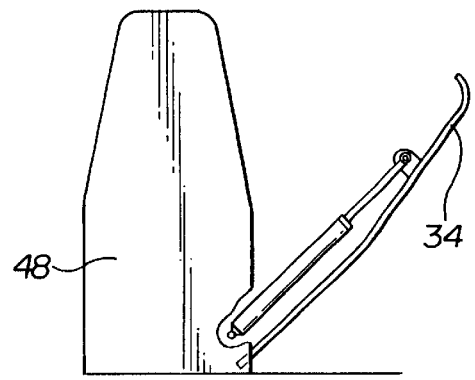
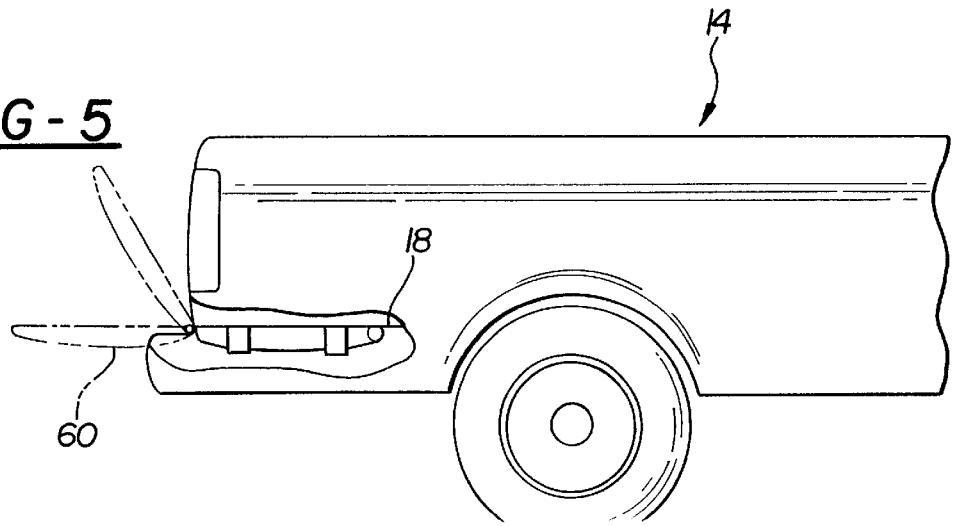

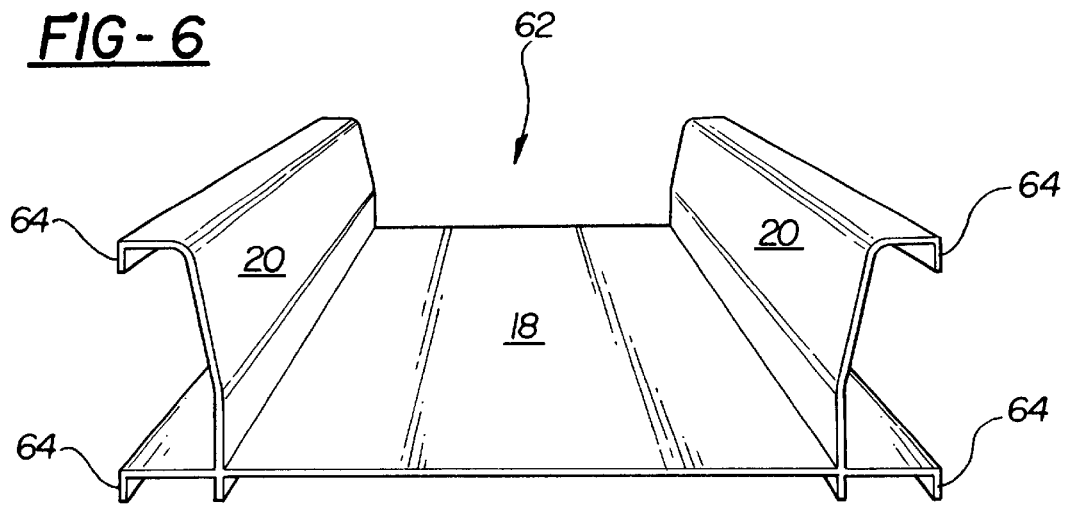
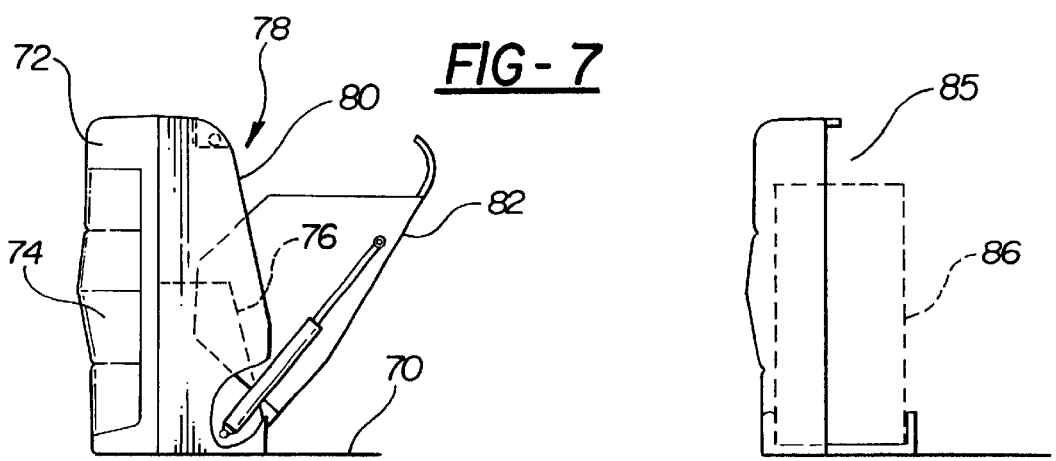
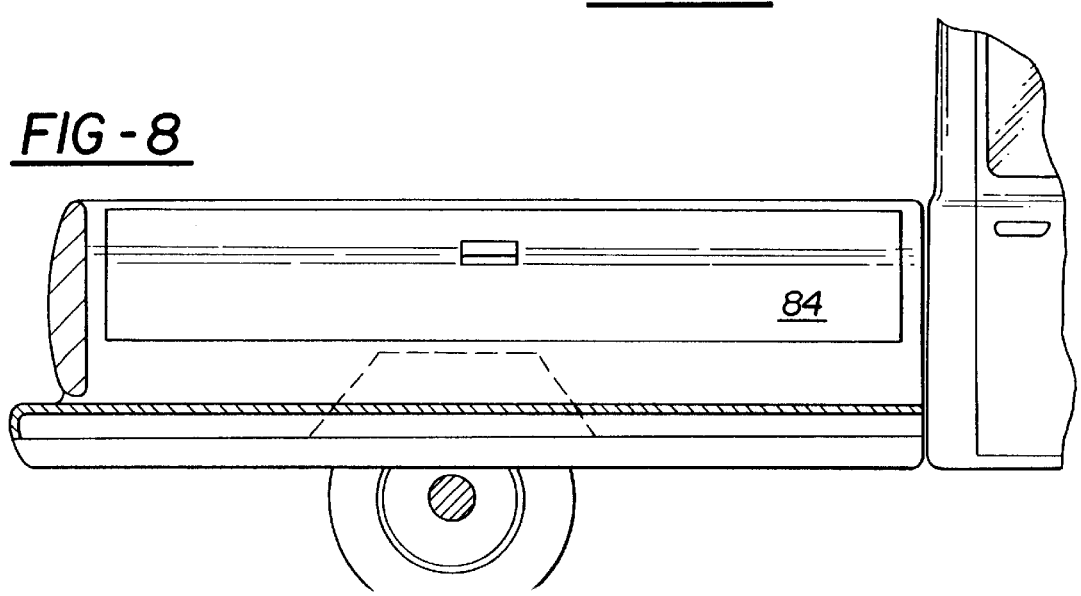

AERODYNAMIC STORAGE UNIT FOR TRUCK BED

FIELD OF THE INVENTION

The present invention relates generally to original equipment or after-market storage units for truck beds and, more specifically, to a storage unit that is aerodynamically shaped.

BACKGROUND OF THE INVENTION

Pick-up trucks and other vehicles often suffer from a lack of sufficient storage space. For example, there is no place in the bed of a pickup truck for the storage of small items. An operator is required to either leave small items loose in the bed or to add an after-market tool box of some type. These operators prefer that the truck bed include storage space integrated with the bed such that stored items are not loose in the bed and, preferably, that the storage space be securable such as by locking. However, one of the biggest benefits to a truck is its ability to transport large items, such as 4 by 8 foot sheets of drywall and plywood. Therefore, operators prefer that any storage device provided in the bed of the truck not interfere with the carrying capacity of the truck. Currently available after-market truck tool boxes typically suffer several drawbacks. First, they are not well integrated with the truck and therefore may have a poor aesthetic appearance. The box is also typically positioned transversely, side to side, across the front of the truck bed, thereby interfering with storage of long items in the truck bed. Therefore, there remains a need for storage units for truck beds that integrate well with the truck bed and do not interfere with the ability to transport large, and especially long, items. It is also desirable that such a storage unit provide a pleasing aesthetic appearance and allow for a locking storage area. Finally, it would be desirable that such a storage unit provide aerodynamic benefits over a conventional truck bed. It is generally desirable to improve the aerodynamics of the vehicle. Improving a vehicle's aerodynamics often leads to an improvement in fuel economy. Also, improving aerodynamics may also positively benefit wind noise.

There have been numerous attempts to solve the pickup truck storage problem. For example, U.S. Pat. No. 3,727,971 to Sisters and U.S. Pat. No. 4,705,317 to Henri both show pickup truck storage boxes designed to be positioned longitudinally within the pickup truck bed against the sides of the bed. These storage boxes are approximately the same length as the truck bed and have recesses in their undersides for providing clearance over the wheel wells in the truck bed. These boxes provide the advantages that they utilize space in the truck beds that is often not used, without interfering with the majority of the floor area of the truck bed. However, these storage boxes suffer from several drawbacks. First, they have a poor aesthetic appearance and do not integrate well with the truck bed. Also, as best shown in the Henri patent, storage units are typically accessed by opening a lid positioned at the top of the storage boxes. The pivot for these tops is typically located at the outboard edge of the box so that the lid opens outwardly. This makes it difficult for a user of the box to access the contents of the box by reaching over the side of the truck. Specifically, the lid of the box would be in the way if someone tried to reach over the side. This presents a significant inconvenience. These boxes also offer no aerodynamic benefits.

Another approach is shown in U.S. Pat. No. 5,303,969 to Simnacher. Like the previously discussed patents, Simnacher discloses a longitudinal storage box that is positioned adjacent the side wall of the truck bed so as to not interfere with the load floor. In addition, Simnacher provides hydraulic lifts for raising the storage box upwardly. The box is accessed by opening lids on the upper surface that are hinged at the inner edge of the box. That is, the lids open inwardly. When the box is lifted hydraulically upwardly, these doors are accessible from the exterior of the truck bed. The Simnacher device is needlessly complicated and, like the previous boxes, provides no aerodynamic benefits. Also, the Simnacher device can only be easily accessed from the outside of the truck once it is hydraulically lifted upwardly. This, also, may be inconvenient.

An additional drawback to the previously described devices is that they cannot be easily used with a tonneau cover. U.S. Pat. No. 5,620,124 to Geier attempts to address this problem. Specifically, the Geier patent discloses a saddle bag-like storage device that is supported on the inside of the truck bed by straps which attach to the tonneau cover frame. This approach may be beneficial for some users with tonneau covers. However, its use is limited thereto and does not provide secure, well-integrated storage.

Pickup trucks are used for many different applications, including towing fifth-wheel trailers, a type of trailer in which the front of the trailer rests on a hitch in the center of the truck bed. It is desirable that a storage box does not interfere with this use. An approach to this specific problem is shown in U.S. Pat. No. 5,713,500 to Ingerson et al. A storage box is provided which fits in the bed of the truck adjacent to the tailgate and is shaped so as to fit under the front of the fifth-wheel trailer. This storage device is well-suited to its intended application but is less desirable to those who do not use a fifth-wheel trailer. Specifically, the storage box seriously interferes with the use of the load floor by blocking access to the load floor.

An improvement on transverse storage boxes is shown in U.S. Pat. No. 4,635,992 to Hamilton et al. This patent discloses a storage box that is positioned transversely adjacent the front wall of the truck bed. However, unlike previous approaches, in which the truck box is mounted in place, the Hamilton box is mounted to a pair of rails allowing the box to be moved forwardly and backwardly in the bed. This allows a user to slide the box to the rear limit of the truck for easier access or removal. This makes for easier access to the box, but the box seriously interferes with use of the load floor by shortening the bed. Also, the bed must be empty to roll the box rearwardly. Finally, the Hamilton device does not provide any aerodynamic benefits.

There have also been numerous attempts to improve the aerodynamics of pickup trucks. For example, tailgates may be removed and/or replaced with a net to close off the back of the bed. This supposedly improves the flow of air through the bed by removing a wall at its rear. Tonneau covers and pickup truck caps also recontour the bed to provide aerodynamic benefits. Yet another approach is shown in U.S. Pat. No. 5,743,589 to Felker. A wind deflector is provided which extends angularly upwardly from the rear of the truck bed to the top of the tailgate so as to improve air flow over the tailgate. When not in use, the wind deflector may be folded flushed into the bed of the truck. While this approach may provide some aerodynamic benefits, it does not provide for any storage.

U.S. Pat. No. 5,232,259 to Booker and U.S. Pat. No. 4,938,398 to Hallsen attempt a combination of aerodynamic improvement and storage. In each case, a storage box is positioned adjacent the tailgate of the truck and arranged transversely side to side across the width of the truck bed. The boxes generally have a triangular cross-section with an angled forward surface. This angled surface directs wind upwardly over the tailgate. These storage boxes each suffer from the drawback that they interfere with use of the load floor of the truck bed.

SUMMARY OF THE INVENTION

The present invention overcomes many of the shortcomings of the prior art. An aerodynamic storage unit is provided which utilizes the space along the longitudinal side walls of the truck bed. Such a truck bed typically has a load floor and a pair of spaced apart longitudinal side walls. The storage unit according to the present invention has an inner wall member which is disposed in a spaced apart relationship with one of the pair of longitudinal side walls, so as to define a storage space between the side wall and the inner wall member. The inner wall member has a lower edge which is disposed on the load floor and an upper edge which is joined to the side wall. At least a portion of the inner wall member between the upper and lower edges is outwardly inclined. At least one access opening is defined in the inner wall member and communicates with the storage space. A door is disposed in the access opening. The door has a lower end which is hingedly attached to the inner wall member and an upper end. The lower end is closest to the load floor and the upper end is farthest from the load floor. The door opens inwardly, whereby when the door is opened inwardly the storage space can be accessed through the opening. In some embodiments of the present invention, a stowable tailgate is also provided which stows in a support frame mounted below the load floor. In other embodiments, additional access openings and/or doors are provided. Also, an aerodynamic unit may be provided without access openings or doors.

BRIEF DESCRIPTION OF THE DRAWINGS

FIG. 2 is a side elevational view of the truck with the side wall of the truck bed cut away to show the storage unit;

FIG. 3 is a cross-sectional view of the storage unit of FIG. 2 taken along lines 3—3;

FIG. 4 is a cross-sectional view similar to FIG. 3 of a second embodiment of a storage unit according to the present invention;

FIG. 5 is a side elevational view of an optional tailgate arrangement for use with various embodiments of the present invention;

FIG. 6 is a rear elevational view of a stamping for use with the present invention;

FIG. 7 is a rear elevational view of a third embodiment of a storage unit according to the present invention;

FIG. 8 is a side elevational view of a truck with the bed partially cut away and a fourth embodiment of a storage unit according to the present invention installed thereon;

FIG. 9 is a cross-sectional rear view of yet another storage unit;

DETAILED DESCRIPTION OF THE PREFERRED EMBODIMENTS

Figure 1:
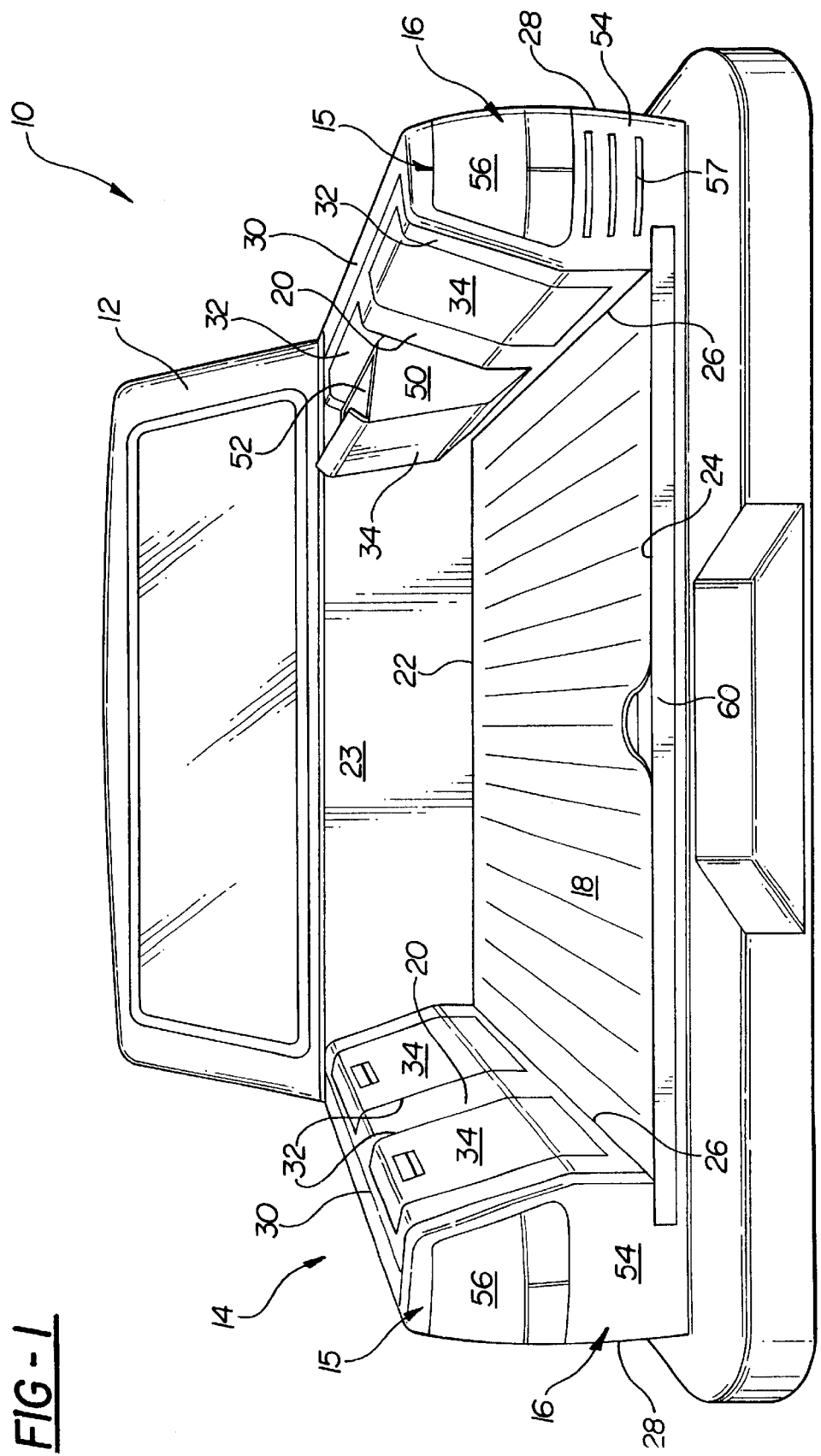
FIG. 1 is a rear perspective view of a truck including integrated aerodynamic storage units according to the present invention.

Referring to FIG. 1, a first embodiment of an aerodynamic storage unit according to the present invention is shown. A truck 10 has a cab 12 and a bed 14 with two sides 15 that run front to rear and are spaced apart so as to define a load floor 18. In this embodiment, each of the sides 15 of the truck 10 are formed as aerodynamic storage units 16 according to the present invention. That is, the first embodiment of the present invention, as shown in FIG. 1, is an original equipment aerodynamic storage unit system which takes the place of traditional sides on a pickup truck bed. Therefore, "sides" and "aerodynamic storage unit" will be used interchangeably for this embodiment.

For ease of description, the load floor 18 of the bed 14 is defined as having a front edge 22 at the front wall 23, adjacent the cab 12 of the truck 10. The load floor 18 extends rearwardly from the front edge 22 to a rear edge 24 which is generally parallel to the front edge 22 and spaced therefrom by a distance of several feet, typically 6 or 8 feet. Therefore, the length of the load floor 18 is defined as the distance between the front edge 22 and the rear edge 24. The load floor 18 extends widthwise between a pair of side edges 26 which are generally parallel to one another and perpendicular to the front 22 and rear 24 edges. Normal pickup truck beds have wheel wells which extend upwardly from their load floor to allow clearance for the rear wheels of the truck. The side-to-side distance between the wheel wells is typically at least four feet in order to allow 4×8 foot sheets of building materials to be stacked flat on the load floor. Similarly, it is preferred that the side edges 26 of the load floor 18 be spaced at least four feet apart so that a truck 10 including the aerodynamic storage units 16 retains the ability to transport sheets of building material.

As shown, the truck bed 14 includes two aerodynamic storage units 16 with one arranged lengthwise at each side edge 26 of the load floor 18. The aerodynamic storage units 16 each include inner walls 20 which extend generally upwardly from the side edges 26 of the load floor 18. Each aerodynamic storage unit 16 also includes outer walls 28 which are spaced from the inner walls 20 and help to define the sides of the truck 10. Therefore, the outer walls 28 would typically be painted body color to match the remainder of the truck 10. The inner walls 20 and outer walls 28 are joined to one another by top surfaces 30. Together, the inner walls 20, outer walls 28 and top surfaces 30 cooperate to define an interior storage space inside each of the storage units 16. As shown, at least a portion of the inner wall is inclined outwardly. Preferably, the outward incline is at least 10 degrees relative to the vertical. Alternatively, the outward incline may be only five degrees or may be more than 10 degrees. A pair of access openings 32 are defined in each of the aerodynamic storage units 16 to allow access to the storage space defined therein. As shown, the openings 32 in the inner wall 20 of each of the aerodynamic storage units 16 can extend partially around into the top surfaces 30. Doors 34 are positioned in each of the openings 32, such that they open inwardly towards the center of the load floor 18. The doors 34 are pivotally connected with the remainder of the aerodynamic storage unit 16 near the bottom of the doors 34, adjacent the load floor 18.

Referring now to FIG. 2, the inner wall 20, openings 32 and doors 34 are again shown. Also shown in this Figure is a wheel well 36 which is defined within the interior of the aerodynamic storage unit 16. As shown, the wheel well 36 takes part of the interior storage space within the storage unit 16. That is, the wheel well 36 extends upwardly into the bottom of the storage unit 16. The doors 34 and openings 32 are positioned such that they access storage space primarily forwardly and rearwardly of the wheel well 36. This allows for efficient space utilization.

Referring now to FIG. 3, details of the doors 34 will be discussed in more detail. Each door 34 has an upper edge 38 and a lower edge 40. The doors 34 are interconnected with the remainder of the aerodynamic storage unit 16 by hinge 42 adjacent the lower edge 40 of the door 34. A latch 44 is also shown for latching the door 34 in its closed position. As will be clear to one of skill in the art, the latch 44 may be any of many different designs, including locking and non-locking latches. Also, the latch 44 may be positioned in different locations than the location shown. Also shown in FIG. 3, the aerodynamic storage unit 16 includes a bottom surface 46 which cooperates with the inner wall 20, outer wall 28 and top surface 30 to define an interior storage space 48 within the aerodynamic storage unit 16. Also as shown, the door 34 may include a storage bin 50 defined on its inner surface so as to reside in the interior storage space 48 when the door 34 is closed. The storage bin 50 is preferably shaped so as to take advantage of most of the interior storage space 48. Items to be stored may be placed inside the storage bin 50, which has an upper opening 52. When the door 34 is tilted inwardly towards the center of the load floor 18, items stored in the storage bin 50 are easily accessible through the upper opening 52. Items stored in storage bin 50 may be accessed either over the side of the truck or from inside the bed.

That is, when the door 34 is opened, the opening 52 in the storage unit 50 faces upwardly allowing access from either inside or outside the truck bed. Also, because the door 34 tilts inwardly, rather than upwardly, it does not interfere with anything placed above the side of the truck, such as a cap, tonneau cover, or fifth-wheel trailer. Each door 34 preferably includes a gas-filled strut 35 to assist in opening and closing the door 34.

Referring now to FIG. 4, a second embodiment of the present invention is shown. In this embodiment, the door 34 does not include a storage bin, as in the previous embodiment. Instead, items to be stored are placed in the interior storage space 48.

Referring now to FIGS. 1, 3 and 4, the storage units 16 are designed so as to be aerodynamic. As shown, the inner wall 20 of each storage unit 16 is generally outwardly sloped and curves into the top surface 30 so as to give a smoothly curved surface that is both aerodynamically efficient and aesthetically pleasing. As shown in FIG. 1, the storage units 16 each include a rear face 54 which includes lights 56 such as tail lights and backup lights. In addition, the rear face 54 may include vents 57 to allow air to flow out of the unit 16. The vents 57 may be designed as one way vents to prevent contamination from flowing into the unit 16. Also shown in FIG. 1, the truck bed 14 preferably does not include a traditional tailgate. Removal of the tailgate provides aerodynamic advantages by preventing air from being trapped and swirled in the bed. The shape of the storage unit 16 enhances this benefit. Traditionally, removing the tailgate is disadvantageous because items being stored in the bed 14 of the truck 10 could fall off the rear edge 24 of the load floor 18 while the vehicle is being driven. Because the storage unit 16 provides areas to store items, small items will typically not reside on the load floor 18 and therefore the tailgate is not required to retain them.

Referring now to FIG. 5, an alternative tailgate arrangement for use with various embodiments of the present invention is shown. In this embodiment, a tailgate 60 is stored inside the load floor 18 of the truck bed 14 when not in use, as shown by the solid lines. When the tailgate 60 is needed, it is pulled out of the load floor 18 as shown by the dotted lines and folded upwardly against the rear face of the bed 14.

Referring back to FIG. 1, an optional tailgate 60 is shown located below the load floor 18. As will be apparent to one of skill in the art, the tailgate 60 is shaped such that it mates with the rear faces 54 of the aerodynamic storage units 16. This arrangement allows the tailgate to be stored during normal usage of the truck 10 and to move so as to close off the rear of the load floor 18 when necessary.

Referring again to FIG. 1, the aerodynamic storage units 16 may be designed in a variety of ways. As shown, the outer walls 28 have a relatively vertical appearance designed to maximize the interior space 48. Alternatively, the aerodynamic storage unit 16 may be designed so as to utilize normal exterior sheet metal so that the outer walls 28 are actually the same as the exterior sheet metal of a normal truck bed. In this way, a truck may be offered with and without the interior bed storage units 16, with each variety having the same exterior appearance.

Referring now to FIG. 6, a stamping 62 is shown for use with existing truck side panels. Stamping 62 includes the inner walls 20 of the storage units as well as the load floor 18. The stamping 62 may be provided to manufacturers so that they may attach their exterior sheet metal thereto. For this purpose, the stamping 62 is provided with outer flanges 64 to which the normal exterior sheet metal may be welded or otherwise attached.

Thus far, the aerodynamic, storage units have been discussed as original equipment units which would be installed at the factory and integrated with either new or existing sheet metal. A storage unit according to the present invention can also be provided as an after-market retrofit to allow owners of existing trucks to modify their truck bed to provide the advantages of the present invention. Referring now to FIG. 7, a portion of a load floor 70 and side wall 72 of an existing truck bed are shown. As shown, the side wall 72 includes a tail light 74. A wheel well 76 extends upwardly from the load floor 70 and inwardly from the side wall 72. In this embodiment, the aerodynamic storage unit 78 includes an inner wall 80 which extends upwardly and outwardly from the existing load floor 70 and curves so as to join the top of the side wall 72. A door 82 is positioned in the inner wall 80, similar to the earlier embodiments. An owner of an existing truck may add the storage unit 78 to provide additional storage and may then remove the tailgate, or leave it down, to gain additional aerodynamic benefits. Obviously, as with the prior embodiments, the storage unit 78 may come in a variety of configurations, such as with or without a storage bin on the door 82.

Thus far, the aerodynamic storage units have been discussed as having a pair of doors. However, other variations are possible on each of the embodiments thus far discussed. For example, as shown in FIG. 8, each aerodynamic storage unit may include one large door 84 instead of two small doors. As another alternative, as shown in FIG. 9, the storage units may not include doors and instead include openings 85 in the inner wall of the storage unit so that items 86 to be stored may be placed in through the openings 85 and rest therein. Obviously, the openings 84 or 85 may be of various shapes and sizes. Alternatively, each storage unit may include one door and one opening instead of two openings. If one door and one opening is combined in the storage unit, it is preferred that the door be positioned towards the front half of the storage unit and the opening without a door be positioned towards the r ear. As discussed earlier, with reference to FIG. 1, the rear face of each storage unit may include vent s to allow air to flow out of the storage unit. These vents are particularly important with the embodiment of FIG. 9. The vents allow air to flow into the openings 84 and out through the vents thereby reducing turbulence in the truck bed.

As yet another embodiment, the inner wall may include no openings and be designed to provide just the aerodynamic benefits without the storage benefits. For example, a storage unit may be installed on one side of a bed and a matched aerodynamic inner wall installed on the other. This would provide aerodynamic and aesthetic benefits where less storage is required.

As will be clear to one of skill in the art, many variations on the above discussed embodiments may be made. For example, while it is envisioned that the various components of the storage units be made from steel or other metal, they may alternatively be made from plastic such as sheet molding compound or out of any other material suitable to the task. Also, many variations, other than those discussed, may be made on the configurations of the doors and openings of the storage units. For example, two openings may be provided in the inner wall of the storage unit with only one of the openings having a door with the other opening remaining open. Also, the aerodynamic storage unit may be designed for specific applications, such as to store specific types of tools or materials. The doors and openings may be varied in shape, size and configuration so as to suit a variety of tasks. Also, the storage units may be provided in a modular fashion such that doors with storage bins may be later added to units that originally had openings, and vice versa. As another alternative, electrical power may be provided to outlets inside the storage units so that various tools and accessories may be powered therein. Also, accessories such as radios may be integrated with the storage units. Also, while the present invention has been discussed for use with trucks, the present invention may also be modified for use with other vehicles, such as cars.

Figure 10:
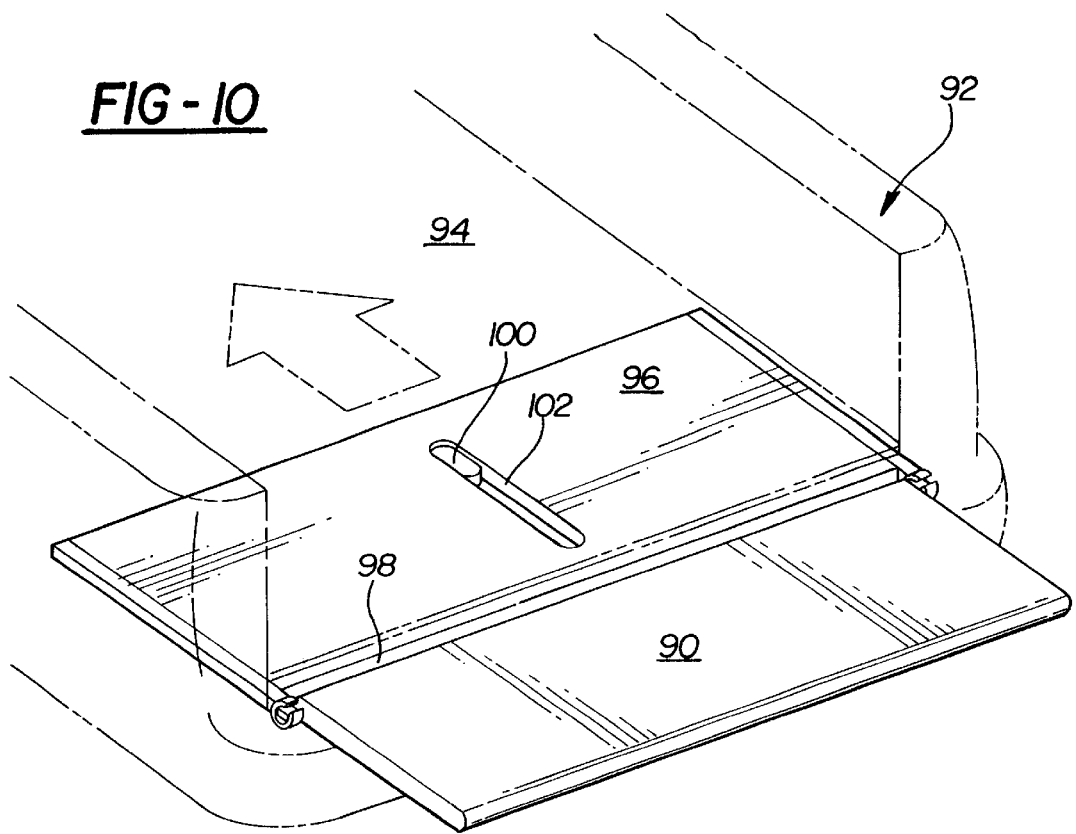
FIG. 10 is a perspective view of the first embodiment of a stowable tailgate design for use with the present invention.
Figure 11A:
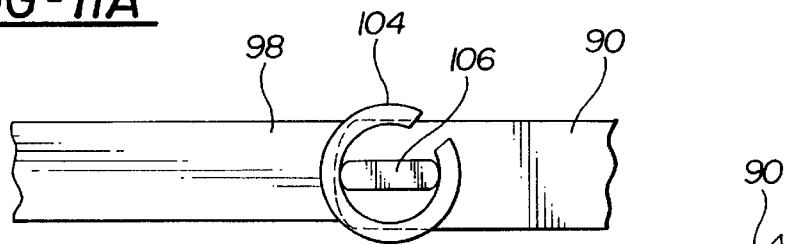
FIG. 11A is a detailed view of the hinge design used for the stowable tailgate of FIG. 10.
Figure 11B:
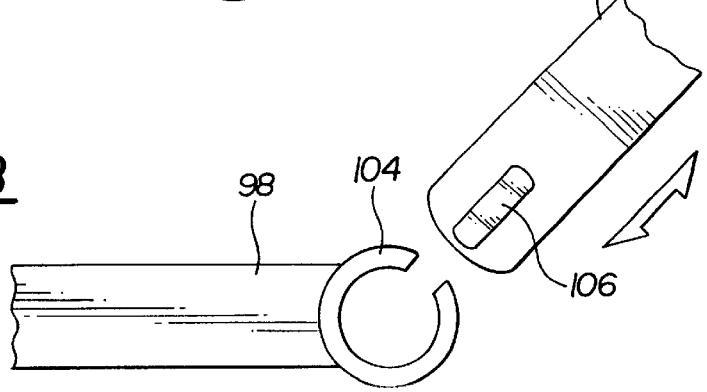
FIG. 11B is a detailed view similar to FIG. 11A but with the tailgate removed from the hinge assembly.

As discussed earlier, in one preferred embodiment of the present invention, a stowable tailgate is provided for use with the aerodynamic storage units. This enhances the aerodynamic benefits while still allowing use of the tailgate when needed. Referring to FIG. 10, a first embodiment of a stowable tailgate 90 is shown. A truck 92 i s shown in phantom lines in FIG. 10 and has a load floor 94. An upper mounting plate 96 is mounted under the load floor 94. Though not shown, a corresponding lower mounting plate is mounted a short distance below and parallel to the upper mounting plate 96 so as to define a space therebetween. The stowable tailgate 90 is hingedly interconnected with a support plate 98 which is sandwiched between the upper mounting plate 96 and the lower mounting plate. The support plate 98 includes a tab 100 that projects into a slot 102 in the upper mounting plate 96. With the tailgate 90 in its downward position, as shown, it may be pushed into the space between the upper mounting plate 96 and the lower mounting plate. The support plate 98 moves with it thereby moving the tab 100 to the rear of the slot 102. In FIG. 10, the tab 100 is shown in its rearmost position, where the tab would be located with the tailgate fully stowed. This embodiment of a stowable tailgate merely illustrates one possible approach to providing such a tailgate. Preferably, the tailgate 90 may also be removable, as shown in FIGS. 11A and 11B. That is, an outer ring 104 may be mounted to the rearmost edge of the support plate 98 with a corresponding pivot tab 106 on the tailgate 90 being received therein. tailgate fully stowed. This embodiment of a stowable tailgate merely illustrates one possible approach to providing such a tailgate. Preferably, the tailgate 90 may also be removable, as shown in FIGS. 11A and 11B. That is, an outer ring 104 may be mounted to the rearmost edge of the support plate 98 with a corresponding pivot tab 106 on the tailgate 90 being received there.

Figure 12:
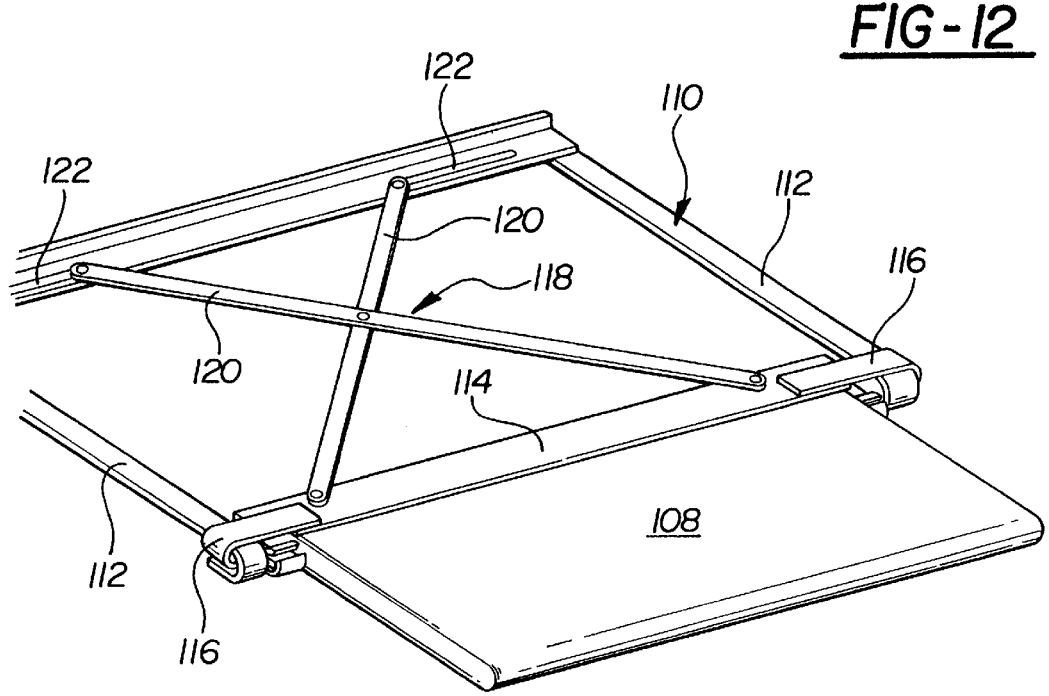
FIG. 12 is a perspective view of a second embodiment of a stowable tailgate design for use with the present invention.
Figure 13:
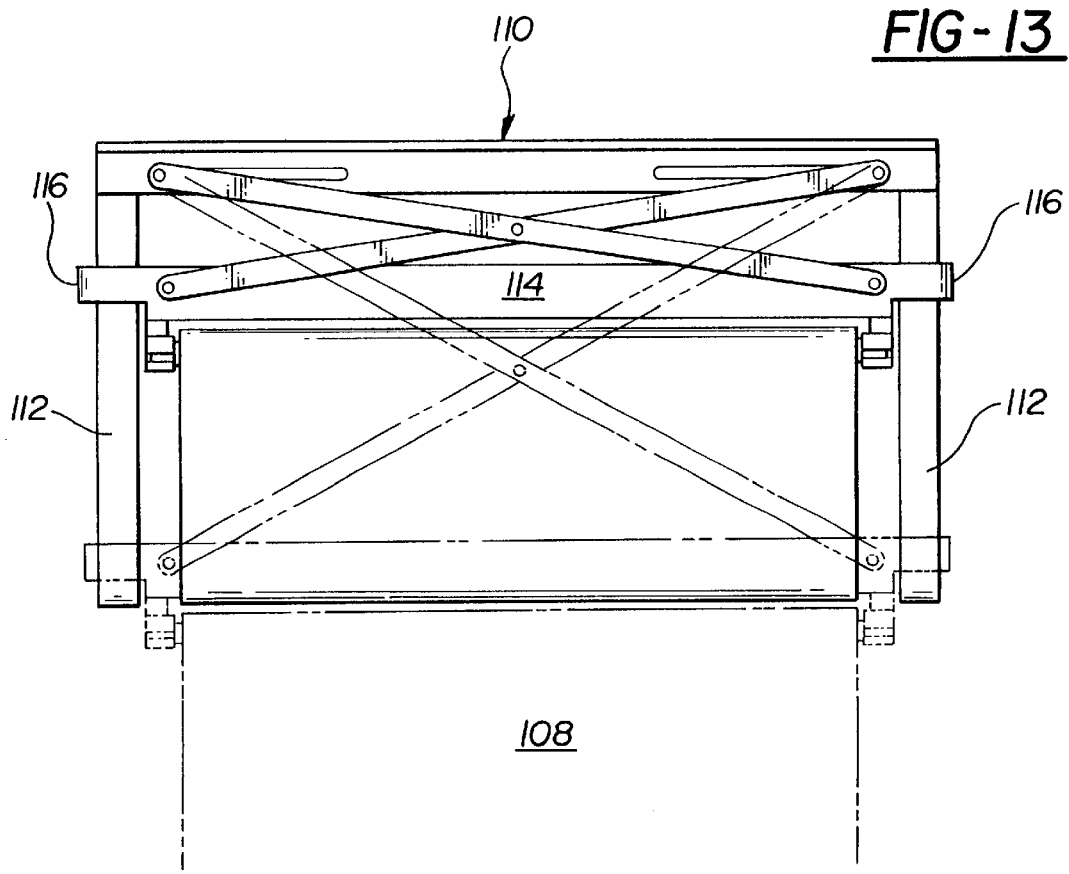
FIG. 13 is a top view of the design of FIG. 12 showing the movement of the mechanism.

Referring now to FIGS. 12 and 13, an alternative approach to providing a stowable tailgate 108 is shown. A support frame 110 is provided which is designed to be mounted to the under side of the load floor of a pickup truck bed. The support frame has a pair of longitudinal support rails 112 which are parallel to one another and spaced apart by approximately the width of the tailgate 108. The tailgate 108,is hingably interconnected with a transverse support bar 114 which extends between and is supported by the support rails 112. Engagement members 116 extend from each end of the support bar 114 and pass around the support rails 112. To stow the tailgate 108, it is pushed towards the support frame 110 such that the support bar 114 slides along the support rails 112. This stowage operation is best shown in FIG. 13. To further guide the support bar 114 as it travels; along the rails 112, a scissor mechanism 118 is provided. The scissor mechanism 118 consists of two scissor links 120 which each interconnect with the ends of the support bar 114. The links 120 cross one another and engage slots 122 in the rear of the frame 110. Though not shown, the links 120 are either interconnected such that their pivot point may move or slots are provided in the support bar 114. As shown in FIG. 12, with the tailgate in a non-stowed position, the links 120 form an "X" with the links close to perpendicular to one another. As the tailgate is stowed and the support bar 114 moves rearwardly, the links are pivoted such that they move to a position much closer to parallel to one another, as shown in FIG. 13. As will be clear to those of skill in the art,l the scissor mechanism 118 may in addition include springs or other assistance devices to assist in stowing and unstowing the tailgate 108. Also, preferably, a closure plate of some type is provided below the support frame 110 for sealing the stowage mechanism from road debris. This helps the tailgate to remain stowable under all conditions.

As will be clear to one of skill in the art, the present invention may be modified in various ways without departing from the intent or teachings of the present invention. Therefore, the foregoing specification and drawings should be interpreted broadly.

I claim:

1. An aerodynamic storage unit for a truck bed having a load floor extending between a pair of longitudinal side walls, said storage unit comprising:

an inner wall member disposed in a spaced apart relationship with one of the pair of longitudinal side walls so as to define a storage space therebetween, said inner wall member having a lower edge disposed upon the load floor and an upper edge joined to the side wall, at least a portion of said inner wall member between said upper and said lower edges being outwardly inclined, at least one access opening defined in said inner wall member in communication with said storage space; and a door disposed in said access opening, said door having a lower end hingedly attached to said inner wall member and a upper end, said lower end being closest to the load floor and said upper end being farthest from the load floor, said door operable to open inwardly, whereby when said door is opened inwardly, said storage space can be accessed through the opening.

2. The aerodynamic storage unit according to claim 1, wherein said door has an inner surface, said storage unit further comprising a storage bin supported on said inner surface so that said storage bin is accessible when said door is open.

3. The aerodynamic storage unit according to claim 1, further comprising a second access opening defined in said inner wall member in communication with said storage space.

4. The aerodynamic storage unit according to claim 3, further comprising a second door disposed in said second access opening, said second door having a lower end hingedly attached to the inner wall member and a upper end, said lower end being closest to the load floor and said upper end being farthest from the load floor, said second door operable to open inwardly, whereby when said second door is opened inwardly, the storage space can be accessed through the opening.

5. The aerodynamic storage unit according to claim 1, wherein said outwardly inclined portion of said inner wall member is inclined at least 5 degrees from vertical.

6. The aerodynamic storage unit according to claim 1, wherein said outwardly inclined portion of said inner wall member is inclined at least 10 degrees from vertical.

* * * * *